United States Patent
Bogenschuetz et al.

(10) Patent No.: US 7,152,904 B2
(45) Date of Patent: Dec. 26, 2006

(54) CORNER BOW FOR A VEHICLE HAVING A FOLDING TOP

(75) Inventors: Raimund Bogenschuetz, Oxford (GB); Ludwig Spoeckner, Elsendorf (DE); Martin Wegge, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/154,565

(22) Filed: Jun. 17, 2005

(65) Prior Publication Data
US 2005/0248179 A1 Nov. 10, 2005

Related U.S. Application Data

(63) Continuation of application No. PCT/EP2003/014173, filed on Dec. 12, 2003.

(30) Foreign Application Priority Data
Dec. 19, 2002 (DE) .................. 102 59 482

(51) Int. Cl.
*B60J 7/08* (2006.01)
(52) U.S. Cl. ............................... 296/107.12
(58) Field of Classification Search ........... 296/107.12, 296/109, 118, 121, 122
See application file for complete search history.

(56) References Cited

U.S. PATENT DOCUMENTS

| 2,540,454 A | | 2/1951 | Milhan | |
|---|---|---|---|---|
| 2,711,924 A | * | 6/1955 | Hewitt | 296/107.12 |
| 4,487,447 A | | 12/1984 | Schroeder | |
| 4,693,509 A | * | 9/1987 | Moy et al. | 296/201 |
| RE34,033 E | * | 8/1992 | Godette | 296/107.07 |
| 5,918,928 A | * | 7/1999 | Kolb et al. | 296/107.04 |
| 6,237,986 B1 | * | 5/2001 | Neubrand et al. | 296/107.01 |
| 6,270,143 B1 | * | 8/2001 | Heselhaus et al. | 296/107.01 |
| 6,629,719 B1 | * | 10/2003 | Sims | 296/109 |

FOREIGN PATENT DOCUMENTS

| DE | 195 15 541 C1 | 6/1996 |
|---|---|---|
| DE | 100 29 471 A1 | 1/2002 |
| EP | 1 184 218 A1 | 3/2002 |

* cited by examiner

*Primary Examiner*—H Gutman
(74) *Attorney, Agent, or Firm*—Crowell & Moring LLP

(57) ABSTRACT

A corner bow for a vehicle having a folding top can be swiveled about a transverse vehicle axis formed jointly on lateral folding top control arms. The corner bow is fastened to the folding top fabric or to a tension band that connects several transverse hoops or "bows" of the folding top. The corner bow has a stop, while the folding top control arm (or another linkage element of the folding top) has a counterstop. The corner bow is loaded by a spring element about the transverse vehicle axis, such that, during an adjustment of the closed folding top into a rearward storage (or "open") position, or during adjustment of the open folding top into the closed position (covering the vehicle occupant compartment), the stop approaches the counterstop. In the respective open position or closed position of the folding top, the stop rests against the counterstop.

10 Claims, 1 Drawing Sheet

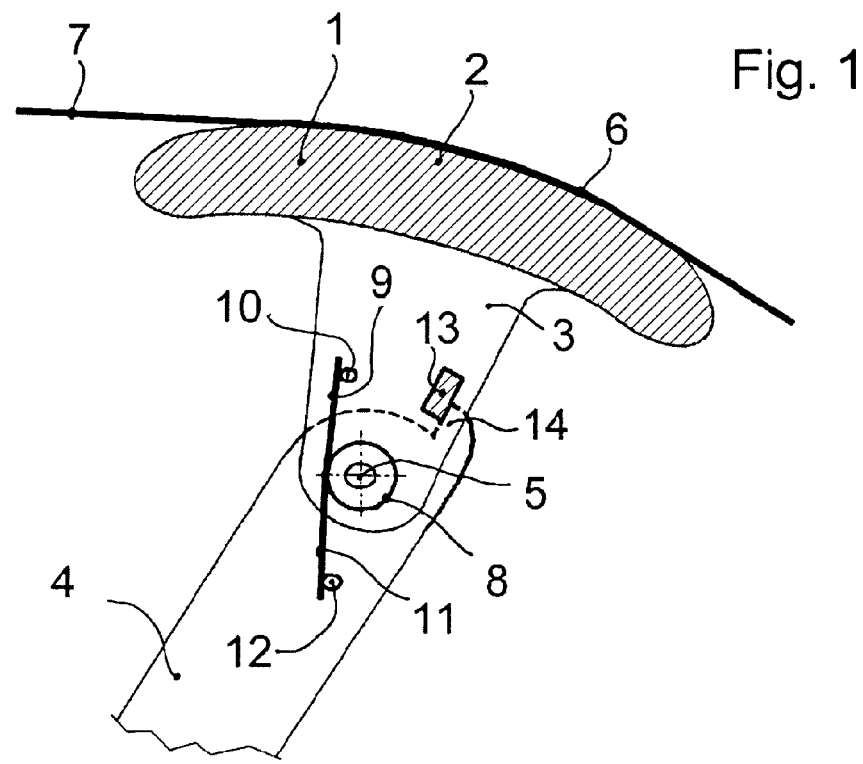
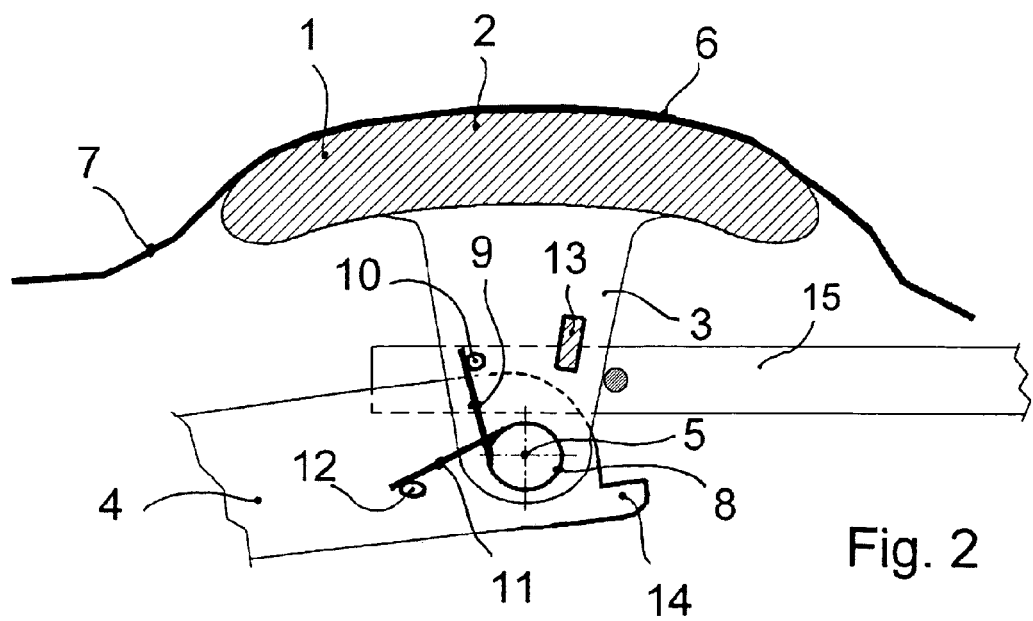

CORNER BOW FOR A VEHICLE HAVING A FOLDING TOP

CROSS-REFERENCE TO RELATED APPLICATIONS

This application is a continuation of PCT Application No. PCT/EP2003/014173 filed on Dec. 12, 2003, which claims priority to German Application No. 102 59 482.1 filed Dec. 19, 2002.

The invention relates to a corner bow for a vehicle having a folding top.

In FIG. 2 of German Patent Document DE 100 29 471 A1, a corner bow of this type has a lever arm pointing approximately radially away from the transverse axis of the vehicle, to which a control arm of the folding top linkage is articulated. The control arm appears to have been provided for controlling the swiveling movement of the corner bow when adjusting the folding top from a closed position to an open position and vice-versa. Control of the corner bow in this manner requires high expenditures and increases the cost of the folding top. The lever arm at the corner bow and the control arm hinged to it restrict the vehicle occupant compartment, and also the rear luggage space when the folding top is open.

One object of the invention is to provide a corner bow for a vehicle folding top, which can be swiveled about a transverse vehicle axis, and which, in the closed position of the folding top, represents less of a restriction of the vehicle occupant compartment.

Another object of the invention is to provide such a corner bow which can be compactly folded together into a rearward storage position when the folding top is adjusted.

These and other objects and advantages are achieved by the corner bow according to the invention, which can be swiveled about a transverse vehicle axis formed jointly on lateral folding top control arms. The corner bow is fastened to the folding top fabric or to a tension band that connects several transverse hoops or "bows" of the folding top. The corner bow has a stop, while the folding top control arm (or another linkage element of the folding top) has a counterstop. The corner bow is loaded by a spring element about the transverse vehicle axis, such that, during an adjustment of the closed folding top into a rearward storage (or "open") position, or during adjustment of the open folding top into the closed position (covering the vehicle occupant compartment), the stop approaches the counterstop. In the respective open position or closed position of the folding top, the stop rests against the counterstop.

That is, the stop at the corner bow and the counterstop at the folding top control arm or linkage element can be arranged such that they rest against one another, and thereby take up a defined angular position with respect to one another, either in the closed position or in the open position. In the respective other position (that is, either the closed position or the open position of the folding top), the corner bow can be adjusted, (for example, by the tension force of a tension belt or of the folding top material or, when adjusting the folding top into the storage position, in an interaction with a part of the folding top situated under and/or over the corner bow) against the force of the spring element into a desired (for example, horizontal) angular position. In this position, either the folding top fabric can be optimally supported by the corner bow or the corner bow can take up a favorable (e.g., horizontal) position in which the folding top is compactly folded together, so that a luggage space situated under the folding top compartment can be less restricted. In a further embodiment of the invention, when the folding top is closed, the stop of the corner bow rests against the counterstop of the folding top control arm or linkage element under prestress.

Another embodiment of the invention provides that, in both the closed position and the storage position of the folding top, the corner bow, which is curved in a center area, is convex in the upward direction, and that, in the storage position of the folding top, it is arranged approximately horizontally. For example, in this case, a frontmost crossbow of the folding top, which is upwardly convex in the closed position, and the corner bow as well as other parts of the folding top, can be compactly stored from above in the storage position on, for example, a vertically adjustable folding top compartment floor. In the upper position of the folding top compartment floor, the space situated below the folding top compartment floor can be better utilized, for example, for depositing pieces of luggage.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross-sectional view of the corner bow swivelably supported by a folding top control arm, in the closed position of the folding top (in which the passenger compartment is covered); and FIG. 2 is a corresponding view when the folding top is in the open position.

DETAILED DESCRIPTION OF THE DRAWINGS

In FIG. 1, the corner bow 1 (which is shown in a cross-sectional view, with the folding top is closed) has a center region 2 which is convexly curved in the upward direction and which is laterally connected with downward-extending swivel arms 3. The corner bow 1 can be swiveled about a common transverse axis 5 of the vehicle, which passes through both the downwardly projecting end region of the swivel arm 3 and a facing end region of a folding top control arm 4. An exterior surface 6 of the bow 1, which is slightly curved in the longitudinal direction of the vehicle, and curved more sharply in the transverse direction of the vehicle, is connected with a tension belt 7, for example, by means of an adhesive layer.

In the closed position of the folding top, the exterior surface extends diagonally downward toward the rear of the vehicle (toward the right in the figure). When the folding top is closed, the tension belt 7 extends laterally from a frontmost transverse bow (not shown), toward the rear to a U-shaped tension bracket which, by means of forward-oriented legs, is arranged below a rear window and can be swiveled upward or back about a swiveling axis formed at its forward leg ends into an approximately horizontal driving position.

In the illustrated closed position of the folding top in FIG. 1, a spring element 8 supported about the transverse vehicle axis 5 is prestressed and biases the corner bow 1 in a clockwise direction about the transverse vehicle axis 5 with respect to the folding top control arm 4. For this purpose, a leg 9 of the spring element 8 is supported on a supporting bolt 10 on the concerned swivel arm 3. Another leg 11 of the spring element is supported on a supporting bolt 12 projecting laterally from the folding top control arm 4.

In the illustrated closed position of the folding top (FIG. 1), the corner bow 1 takes up a position in which its exterior surface 6 extends convexly to the outside and downwardly curved toward the rear, as shown. In this case, a stop 13 constructed on the swivel arm 3 of the corner bow 1 rests, under the prestressing force of the spring element, against a counterstop 14 of the folding top control arm 4. During the closing of the open folding top, the corner bow 1 and the folding top control arm 4 (which as a result of the force of the spring element 8 by way of the counterstop 14 rests on the stop 13 of the corner bow 1) are jointly adjusted by means of the increasing tension which is applied to the tension belt 7, upwards into the illustrated closed position of the folding top. In this case the folding top control arm 4 can freely swivel about a lower swiveling axis extending in the transverse direction of the vehicle.

When the folding top is adjusted from the closed position according to FIG. 1 into the open position corresponding to FIG. 2, the tension belt 7 relaxes, and the folding top control arm 4 as well as the corner bow 1 can swivel downward toward the rear into the storage position according to FIG. 2. However, previously a rear window arranged in a rear opening of the folding top fabric is swiveled downward toward the front into an approximately horizontal position and is deposited on a folding top compartment floor (which can be vertically adjusted between a low position and an upper position) in its upper position.

During the adjustment of the folding top into the storage position, the extremity of the corner bow 1 which is on the right in the figure (possibly with an intermediate layer of the folding top fabric) comes to rest on the rear window 15 and is swiveled through an angle of approximately 20 to 40 degrees counterclockwise (against the tension of spring 8) about the transverse vehicle axis 5 upward toward the front. Simultaneously or subsequently, a part of the folding top which is situated over the corner bow 1 comes to rest in the area of the corner bow 1 which is on the left in the figures and then swivels the corner bow 1 counterclockwise about the transverse vehicle axis 5 into the approximately horizontal position illustrated in FIG. 2. In this position, the stop 13 of the corner bow 1 and the counterstop 14 on the folding top control arm 4 are rotated away from one another.

In the illustrated open position of the folding top, the exterior surface 6 of the corner bow 1, which is slightly curved in the longitudinal direction of the vehicle, is arranged approximately horizontally. The center area 2 of the corner bow 1 is in a position convexly curved in the upward direction. As a result, a frontmost transverse bow, which is in each case curved convexly upward in the closed and in the open position of the folding top, as well as the additional parts of the folding top can be compactly arranged above one another and can be deposited on the folding top compartment floor (which is not shown and can be vertically adjusted between an upper position and a low position), in its upper position. When the folding top is in its open position, first the rear window 15, then a region of the folding top fabric; above it, the corner bow; then a folding top fabric fold; on it, a main column; and finally at least one roof element as well as, at the uppermost point, the frontmost transverse bow, are arranged on the folding top compartment floor.

To limit the swiveling angle of the corner bow, the counterstop can also be mounted on another linkage element of the folding top which forms no swiveling axis for the corner bow. It is also conceivable that the swiveling are traversed by the corner bow about the transverse axis of the vehicle can be limited by a stop or a counterstop in both swiveling directions. The cross-sectional shape of the corner bow is arbitrary per se. In contrast to a corner bow which can be swiveled about an axis and which, during the adjusting from the open position into the closed position and vice versa, is swiveled by approximately 180 degrees, a gain in height is achieved by means of the invention which is approximately the result of twice the curvature height of the center area of the corner bow and of twice the height of the lateral swivel arms connected with the center area, because in both the open position and the closed position the corner bow according to the invention is arranged with its convexly curved exterior side oriented in the upward direction. The spring element can be any elastic spring. The stop or the counterstop can be formed by an arbitrarily shaped wall area, such as a projection or an indentation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A corner bow for supporting a vehicle folding top, which corner bow can be swiveled about a transverse vehicle axis formed jointly on lateral folding top control arms, wherein:
    the corner bow is fastened to one of a fabric of the folding top and a tension band connecting a plurality of transverse bows of the folding top;
    the corner bow has a stop and the folding top control arm or another linkage element of the folding top has a counterstop;
    a spring element loads the corner bow about the transverse vehicle axis such that, during adjustment of the folding top from an open, rearward storage position into a closed position covering the vehicle occupant compartment, the stop moves relative to the counterstop and, in the closed position of the folding top, rests against the counterstop.

2. The corner bow according to claim 1, wherein, in the closed position of the folding top, the stop rests against the counterstop under a prestressing force of the spring element.

3. The corner bow according to claim 1, wherein:
    the corner bow has a center area which, in the closed position of the folding top, is outwardly convex in the transverse direction of the vehicle; and
    the center area is laterally connected with downward-oriented swivel arms which form the transverse vehicle axis which passes thorugh extremities of the swivel arms, away from the center area.

4. The corner bow according to claim 3, wherein the center area of the corner bow has an exterior surface which, in the closed position of the folding top, is upwardly convex in the longitudinal direction of the vehicle.

5. The corner bow according to claim 4, wherein the center area of the corner bow has an exterior surface which, in the open position of the folding top, is approximately horizontal.

6. The corner bow according to claim 5, wherein the center area of the corner bow is convex in the upward direction in the open position of the folding top.

7. The corner bow according to claim 6, wherein:
    during an adjustment of the folding top unto the open storage position, the corner bow interacts with at least one of the rear window situated below the corner bow and at least one part or the folding top situated above the corner bow, and swivels into the approximately horizontal position in response to said interaction.

8. A folding top for a motor vehicle, comprising:

a rearwardly situated first bow arranged in a transverse direction of the vehicle, for supporting said folding top, said first bow having an upwardly convex curvature in the transverse direction, and an upwardly convex cross section in a longitudinal direction of the vehicle;

folding top control arms which are pivotably coupled to a body of the vehicle at a first end thereof, and are pivotably coupled at a second end thereof to swivel arms fixed to lateral extremities of the first bow, so that said folding top control arms are rotatable relative to the vehicle body about a first transverse axis, and said first bow is rotatable, via said swivel arms, relative to said folding top control arms, about a second transverse axis; wherein, the first bow is coupled by a flexible member to additional transverse bows which support said folding top;

each swivel arm of the first bow has a stop which bears against a counterstop of one of said folding top control arms when said folding top is in a closed position; and a spring element rotationally biases the swivel arms of the first bow to pivot relative to the folding top control arms, about said second transverse axis such that it urges the stop toward engagement with the counterstop.

9. A vehicle convertible top support structure comprising:

a pair of control arms which are pivotably connected to opposite sides of a vehicle body at respective first ends thereof;

a corner bow for supporting the convertible top in a closed position thereof, said corner bow being pivotably connected at extremities thereof to second ends of the control arms, opposite said first ends;

at each extremity of the corner bow, a stop which is engageable with a counter stop on one of the control arms; and a spring element which biases said corner bow to pivot relative to said control arms; wherein, during a closing movement of said convertible top, said spring element causes said corner bow to rotate in an opposite direction to a rotation of the control arm; and said stop and counter stop engage with each other and prevent further rotation of the corner bow in said opposite direction when said convertible top is in said closed position.

10. The vehicle convertible top support structure according to claim 9, wherein during both closing and opening movements of the convertible top, the corner bow is pivoted in a direction opposite the direction of rotation of the control arm.

* * * * *